May 24, 1932.   L. M. LITTLEFIELD   1,859,305
PNEUMATIC TIRE CASING REPAIRING DEVICE
Filed June 8, 1929
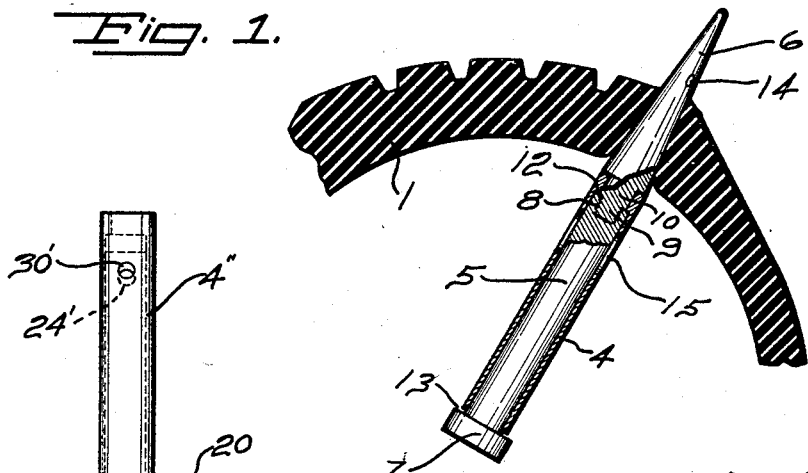
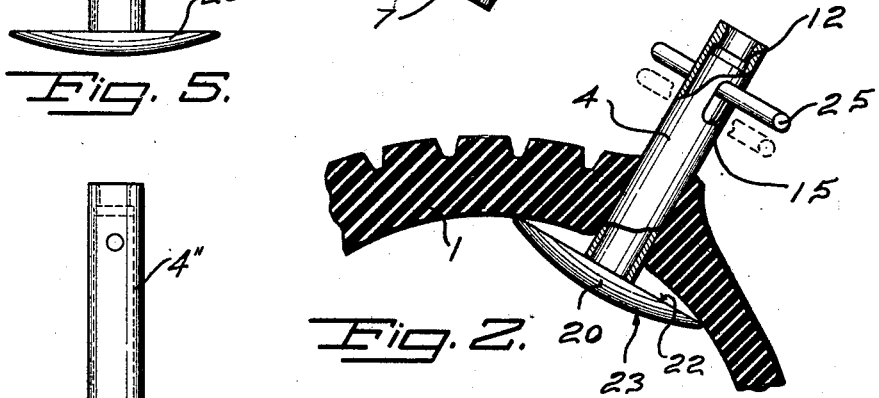
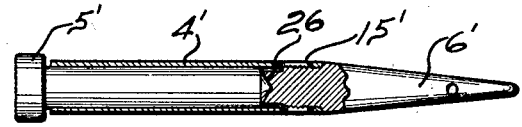
INVENTOR.
Lloyd M. Littlefield.
BY
ATTORNEY.

Patented May 24, 1932

1,859,305

UNITED STATES PATENT OFFICE

LLOYD M. LITTLEFIELD, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

PNEUMATIC TIRE CASING REPAIRING DEVICE

Application filed June 8, 1929. Serial No. 369,279.

My invention relates to the repairing of pneumatic tire casings and more particularly to a repair plug for pneumatic tire casings and a method and means for inserting such a plug.

It is an object of my invention to secure a tighter and better repair than has been possible in the past. Other and further objects will be apparent from the following specification and claims.

In the accompanying drawings which illustrate one embodiment of my invention,

Fig. 1 is a view partly in section showing the inserting tool being driven through the wall of the casing;

Fig. 2 is a similar view showing the manner in which the repair plug is assembled in the inserter;

Fig. 3 is a similar view showing the plug in position in the tire;

Fig. 4 is a view partly in section showing a modified type of plug inserter; and Figs. 5 and 6 show a different modification.

Referring to the drawings, 1 designates the tire casing to be repaired. In the form shown in Figs. 1 and 2 the inserter comprises a cylindrical barrel 4, a driving pin 5 and a point 6. The driving pin is provided at one end with a head 7 and at the other end with a threaded socket 8, adapted to receive a threaded member 9 formed as an extension of an intermediate cylindrical portion 10 of the point 6. As will be clear from Fig. 1 the member 9 is of less diameter than the portion 10 and the latter is of less diameter than the base of the point 6. The portion 10 is also of less diameter than the driving pin 5 and the barrel 4 is formed with an inwardly projecting shoulder 12 which when the inserter is assembled as shown in Fig. 1 is engaged between the base of point 6 and the end of the pin 5. The barrel 4 is of such length that when the parts are assembled there is a space as at 13 between the end of the barrel and the head 7. The barrel is thus drawn into the hole in the tire by the shoulder 12 without danger of marring the edges of the barrel when the head 7 is struck with a hammer to drive the inserter through the casing. The point 6 is provided with a transverse hole 14 adapted to receive a pin to facilitate its disengagement with pin 5.

The barrel 4 is provided adjacent the shoulders 12 with diametrically opposed longitudinal slots 15, these slots have a novel and important function in the use of the inserter as will be more fully explained hereinafter.

The repair plug is preferably formed of rubber and comprises a head 20 and a stem 21, the head being substantially flat on the face adjacent the stem as indicated at 22, the outer face being curved as shown at 23. My improved plug differs from the plugs of the prior art in that the stem is provided adjacent its free end with a transverse hole 24.

In operation the parts of the inserter are assembled as shown in Fig. 1, the point inserted, from the inside of the casing, into the hole to be repaired and the inserter driven, pushed or pulled through the casing to position the barrel 4 substantially as shown in Fig. 2. The point 6 and pin 5 are then disassembled, removed from the barrel 4 and a plug inserted as shown in the latter figure. The slots 15 in the barrel 4 and the hole 24 in the stem 21 are so positioned that when the plug is inserted in the barrel with face 22 against the end of the barrel the hole 24 comes adjacent the inner ends of the slots. A pin 25 is now inserted through slots 15 and hole 24 and drawn into engagement with the outer ends of the slots, thus stretching the stem 21 and drawing the head 20 tightly against the end of the barrel. When the pin 25 engages the ends of the slots continued movement of the pin draws the barrel through the casing, seating the head of the plug tightly against the casing. Further movement completely withdraws the barrel leaving the plug in position in the casing, as shown in Fig. 3, the rubber adjacent hole 24 breaking to release the plug from pin 25. If preferred, after the barrel has been drawn through the casing ¼ to ½" the drawing pin 25 can be removed, thus releasing the upper part of the plug; the drawing pin may then be reinserted to allow the withdrawal of the barrel without rupturing the plug hole. The portion of the plug extending beyond the outer surface of the casing is preferably trimmed off.

In Fig. 4 I have shown a modified form of inserter in which point 6' is threaded into the barrel 4' and driving pin 5' loosely engages the inner end of the point 6' as at 26. The slots 15' are similarly positioned and perform the same function as the slots 15 in the inserter previously described.

In Figs. 5 and 6 I have shown a further modification in which opposed round holes 30 rather than slots are formed in the barrel 4''. In this case the holes 30 are so positioned with respect to the hole 24 in the plug that normally the hole 24 is slightly below registering position with holes 30 but may be brought into such registration, as shown in Fig. 6, by pressing the plug into forced engagement with the barrel. The same result may be obtained by using a tapered pin in place of pin 25, but in either event the pin holds the head of the plug tightly against the barrel.

Having thus described my invention, I claim:

1. A device for inserting puncture sealing plugs, which have a head and an apertured stem, into punctures in pneumatic tire casings, which comprises a hollow cylindrical member adapted to receive the stem of the plug and to be positioned in the puncture to be sealed, and having opposed apertures formed in its walls adjacent one end and so positioned with respect to the aperture in the stem of the plug as to permit the insertion of means through the apertures to hold the head of the plug firmly against the end of the cylinder.

2. A device for inserting puncture sealing plugs, which have a head and an apertured stem, into punctures in pneumatic tire casings, which comprises a hollow cylindrical member adapted to receive the stem of the plug and to be positioned in the puncture to be sealed, and longitudinal opposed slots formed in the walls of the cylindrical member adjacent one end and so positioned that the aperture in the stem of the plug, when the plug is in unstressed condition, is in line with the inner ends of the slots.

3. A device for inserting puncture sealing plugs, which have a head and stem, into punctures in pneumatic tire casings, which comprises a hollow cylindrical member provided with an interior shoulder adjacent one end, a driving pin adapted to engage said shoulder and a conical member having a threaded connection with the driving pin through the shouldered end of the cylinder, the base of the conical member being of the same diameter as the outside diameter of the cylindrical member.

4. A device for inserting puncture sealing plugs, which have a head and an apertured stem, into punctures in pneumatic tire casings, which comprises a hollow cylindrical member, adapted to receive the stem of the plug, provided with an interior shoulder adjacent one end, longitudinal opposed slots formed in the walls of the cylinder and so positioned that the aperture in the stem of the plug, when the plug is in unstressed condition, is in line with the inner ends of the slots, a driving pin adapted to engage said shoulder and a conical member having a threaded connection with the driving pin through the shouldered end of the cylinder, the base of the conical member being of the same diameter as the outside diameter of the cylindrical member.

LLOYD M. LITTLEFIELD.